Fig. 2

May 26, 1931.  A. G. BELDEN ET AL  1,806,664
GRINDING MACHINE
Filed Feb. 19, 1926  5 Sheets-Sheet 3

Inventor
Albert G. Belden
Charles G. Trefethen

Patented May 26, 1931

1,806,664

UNITED STATES PATENT OFFICE

ALBERT G. BELDEN AND CHARLES G. TREFETHEN, OF WORCESTER, MASSACHUSETTS, ASSIGNORS TO NORTON COMPANY, OF WORCESTER, MASSACHUSETTS, A CORPORATION OF MASSACHUSETTS

GRINDING MACHINE

Application filed February 19, 1926. Serial No. 89,458.

Our invention relates to grinding machines and more particularly to a machine of the type described in the application of Charles H. Norton, Serial No. 59,158, filed September 28, 1925, in which cylindrical work is rotatively supported in contact with the grinding wheel and the wheel is fed automatically into the work to grind it to a given size.

Modern factory production methods called for grinding a large number of duplicate pieces rapidly and to an accurate and uniform size. A fully automatic machine is desired for such purposes, but there are many types of work which, for various reasons, cannot be ground efficiently, unless the grinding operation is under the control of the operator to some extent. This is particularly true where difficulty may be experienced in placing the work in the machine preparatory to the grinding operation.

In accordance with our invention we have provided a machine which is semi-automatic in its operation, in that the work may be placed manually in the grinding zone after which the grinding operation may be started, and this will proceed automatically until the work has been ground to a predetermined size. It is accordingly one object of our invention to provide an efficient machine of this type in which the grinding wheel is fed automatically to produce a given size of work and then the wheel is removed from contact with the work, whereupon the grinding operation is stopped without attention on the part of the operator, so that the work may be replaced and the machine again started through its single cycle of operation.

In order to replace the piece of work in a semi-automatic machine, it is desirable that the spindle which supports and rotates the work be stopped at the end of the grinding operation so that the work may be easily mounted thereon without danger to the operator. It is accordingly a further object of our invention to provide an automatically operated control mechanism which will insure stopping the rotation of the work supporting spindle when the grinding operation has been completed and when the grinding wheel is out of contact with the work.

It is moreover desirable that the flow of liquid used to cool the wheel and work be stopped when the work is being replaced, and it is accordingly a further object of our invention to provide an automatic control device which shuts off the flow of liquid to the wheel when the work rotation or the wheel feed movement stops and which serves to start the flow of liquid to the grinding zone when the grinding operation commences.

With these general objects in view, it is a further object to provide a grinding machine in which the work is rotated by an independent power mechanism automatically controlled and operated in timed relation with the wheel movement, so that it is merely necessary for the operator to apply power to the machine by means of a single control device, whereupon the grinding operation proceeds to completion and the work rotation is thereafter automatically stopped.

Another object of this invention is to provide fluid pressure control devices synchronized by a master control which will start and stop the power driving mechanism arranged to rotate the work and control the flow of liquid to the grinding zone.

With these and other objects in view as will be apparent to one skilled in the art, our invention resides in the combination of parts set forth in the specification and covered by the claims appended hereto.

In the drawings which illustrate the embodiments of our invention.

In accordance with one phase of our invention, we provide a grinding machine in which the work is rotatively supported and the grinding wheel is fed positively through a predetermined distance to grind the work to a given size. This feeding operation may be accomplished by means of a feed mechanism, and preferably a cross feed screw and micrometer device, which is power operated and is controlled preferably by a power driven cam. This operation may be made semi-automatic by employing a power feed mechanism which embodies provision for stopping the feeding operation automatically, and preferably after the wheel has been moved through a single cycle to grind the work to a given size and the wheel has been withdrawn from contact with the work. The work is preferably supported and rotated by means which comprise a spindle arranged to be positively rotated by a power mechanism which is independent of the wheel drive. The work rotation may be stopped when the grinding operation has been completed by means which act in timed relation with the wheel feed movement, and preferably when the wheel has been removed to a point remote from the work. This may be accomplished by means of a power driving mechanism for the work rotating spindle, and the power may be suitably applied to and disconnected from the spindle. This may be accomplished by means of a clutch and the clutch may be operated, as in the particular form illustrated, by means of a fluid pressure device which is controlled automatically by the wheel feed mechanism. Also, we prefer to provide means for automatically turning on and off the cooling liquid which is fed to the wheel and the work in the grinding zone, and we may accomplish this by means of a fluid pressure device arranged to operate a valve in the pipe which supplies the cooling liquid. These are preferably so arranged that when the wheel feed stops, the work rotation stops. Also when the grinding wheel leaves contact with the work or when the work stops rotating, the liquid supply is shut off, these movements being suitably timed and synchronized, as by operating the fluid pressure devices from a master control. Our preferred construction utilizes a source of fluid under pressure, such as compressed air, and a valve mechanism is arranged to transmit such fluid to the operating chambers of piston and cylinder devices connected with the clutch and the cooling liquid control valve. This master control may be operated in timed relation with the wheel feed movement and preferably by means of a cam driven in synchronism with the wheel feeding mechanism. For certain types of machines, we prefer to coordinate the work rotation and the cooling liquid control device so that these may be operated in timed relation without reference to the wheel feed movement. In other cases, the control of the work rotation and the control of the coolant may depend upon the wheel feed mechanism which is operated either by hand or by power. These various features of our invention are illustrated in the drawings as combined in a single mechanism, but it is to be understood that they may be employed in different combinations than herein illustrated, and within the scope of the claims appended hereto.

The specific form of grinding machine illustrated comprises a machine base 10 on which is mounted the usual grinding wheel 11 suitably supported in bearings provided in the wheel slide 12 and which is mounted in peripheral opposition to the work. The latter is supported on a power driven headstock spindle 13 and a tailstock spindle 14 carried respectively in the headstock and tailstock 15 and 16 which in turn are adjustably mounted on the slidable table 17 suitably supported on ways on the grinding machine, as will be understood by reference to the prior Patent to Norton No. 762,838 of June 14, 1904. The grinding wheel may be moved towards and from the work by means of a cross-feed screw mechanism comprising a feed screw 20 engaging the half nut 21 which is suitably fixed to the wheel slide. The screw 20 is rotated by means of a large gear 22 mounted thereon (Fig. 4) which meshes with a small gear 23 on a shaft 24 projecting through the front base of the machine. The shaft may be rotated by means of a crank arm 25 connected to the shaft through a micrometer device of the type clearly described in said prior patent to Norton. This device includes a gear 26 keyed to the shaft 24 and a pinion 27 rotatably mounted on the opposite end of arm 25 from the handle. (See Fig. 4). The pinion may be adjusted around the periphery of the gear wheel 26 by means of a crank arm 28 which has a plunger 29 arranged to engage one of several holes in the wide plate-like end of the arm 25. When the plunger is pushed into one of these holes, the handle 25 is thereby made rigid with the gear 26, and the cross feed mechanism is operated by revolving the handle 25. The pinion 27 is also mounted on the end of a plunger 30 to slide longitudinally out of mesh with the gear 26, thereby making feasible a rapid adjustment of the pinion around the gear 26. This adjustment permits one to set the micrometer mechanism as desired and then to feed the wheel into the work until the arm 25 strikes a stop.

The cross feed screw mechanism is arranged to be rotated by a cam operated or controlled power driving mechanism. In the form illustrated we have shown the feed screw as rotated by a heavy weight, the movement of which is controlled by a power driven cam device. For this purpose, an arm 31 is mounted to revolve on the shaft 24 and is arranged to be connected thereto through the hand feed mechanism. To this end, we provide the arm 31 with a spring pressed plunger 32 arranged to engage a socket in the back of the arm 25 and thereby make the parts revolve together. To use the hand mechanism alone, it is merely necessary to withdraw the plunger 32 and hold it out of engagement with arm 25 by suitable means. In order to connect a power mechanism with the shaft, a sprocket 35 is fixed to the hub of the arm 31 to revolve the same. A chain 36 which supports a weight 37 passes over the sprocket and is so arranged that it will tend to turn the cross feed screw in such a direction as to move the grinding wheel towards the work.

Figures 4, 5, 10:
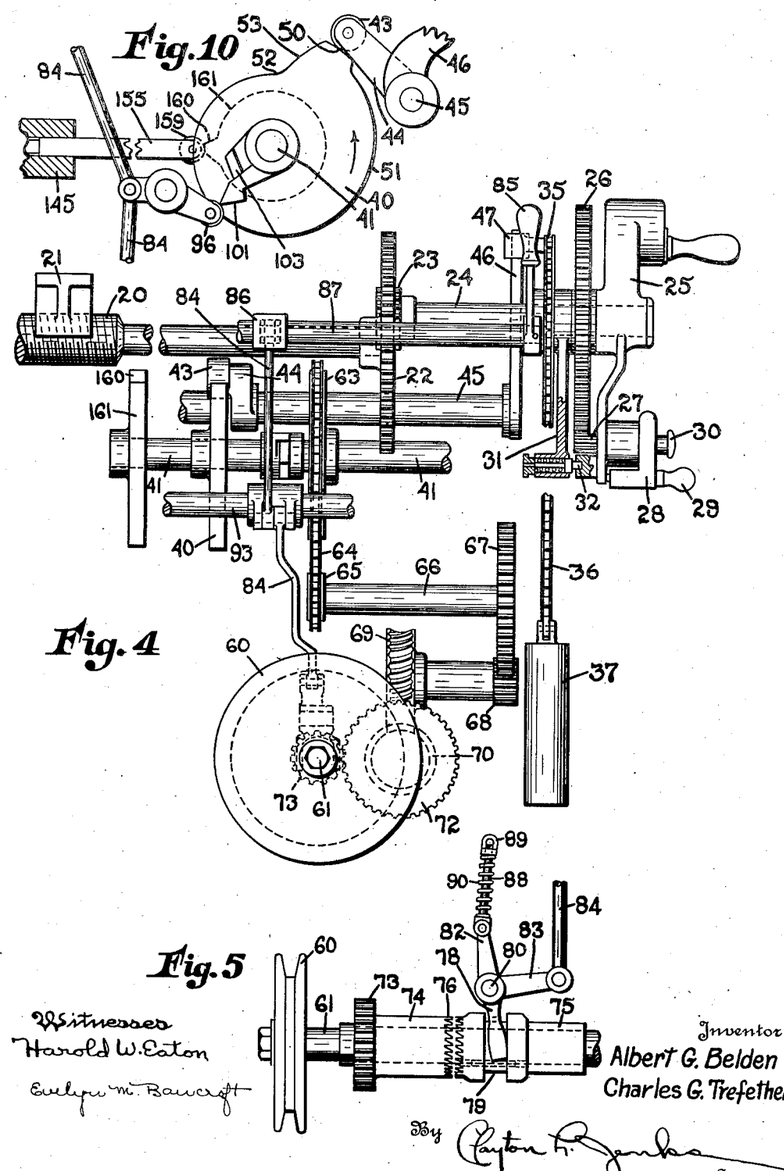
Fig. 4 is a side elevation of the mechanism shown in Fig. 3 with supporting parts of the machine removed.
Fig. 5 is a detail view showing the clutch operating mechanism indicated in Figs. 3 and 4.
Fig. 10 is a diagrammatic view showing the positions of the cams and clutch knockout when the machine is at rest.

In order to control the movement of the chain and weight, we provide a cam 40 (Fig. 4) mounted on the shaft 41. This cam may be shaped as shown in Fig. 10, and is engaged by a follower roller 43 mounted on the arm 44 fixed on the rotatable shaft 45. A second arm 46 fixed on the shaft 45 carries a slide 47 thereon which is connected to the upper end of the chain 36.

It will be understood that the shape of this cam may be varied as desired within the scope of our invention, but as illustrated it is so shaped that when rotated at a uniform rate it will permit controlled movement of the weight 37 and so cause the grinding wheel to feed at a uniform rate into the work and then dwell for a short period while the wheel sparks out and thereafter retreat rapidly from the work and allow a new piece of work to be placed on the work supporting spindles. The cam comprises a high portion 50, shown in Fig. 10, which represents the position at which the grinding wheel is farthest removed from the work. The pull of the weight 37 tends to hold the cam roller 43 against the cam and the tendency of this weight is to cause the grinding wheel to move towards the work. The cam is positively rotated by a driving mechanism in the direction of the arrow shown in Fig. 10, and it will therefore be seen that as the cam roller 43 passes off the high spot 50 of the cam onto the spiral shaped portion 51, the arm 46 will be permitted to rock inwardly towards the sprocket 35 and so cause the feed screw to be rotated to move the wheel forward. This uniform infeed continues until the roller 43 has reached the position 52 representing the completion of the grinding operation, after which the roller rapidly climbs the incline 53 to the starting position thereby moving the wheel quickly away from the work.

An adjustable stop device is provided to limit the infeed of the wheel which comprises an adjustable screw 55 suitably mounted on the side of the base 10 and arranged to be engaged by the lever 31 fastened rigidly to the hub of the sprocket 35, so that as the sprocket turns to move the wheel towards the work, the lever 31 gradually approaches the stop 55. This stop is ordinarily so positioned that the lever will strike it before the cam roller 43 has reached the portion 52 of the cam, thereby holding the roller away from the cam by a slight distance and permitting the grinding wheel to grind its way out and produce a finished surface on the work.

The length of stroke of the grinding wheel towards and from the center of the work may be adjusted by mounting the member 47 on the arm 46 so that it may slide towards and away from its pivotal support, and it may be suitably fastened thereto by a set screw. If the lever 46 were straight, then any movement of the member 47 would tend to turn the feed screw, hence the arm 46 is shaped like an involute of a circle, and it is so constructed and arranged that as the member 47 is moved along the arm 46, the chain 36 will merely wrap itself around the sprocket 35 without turning the feed screw and therefore without changing the position of the grinding wheel.

One important phase of our invention, comprises a mechanism which permits the machine to operate automatically through a single cycle and then stop, so that the operator may have plenty of time to replace the work. Such a mechanism should be manually controllable to start the machine, but the machine should stop automatically when the grinding operation has been completed. While various parts of the machine may be controlled, we particularly prefer to stop the wheel feed and the rotation of the work automatically when the grinding operation has been completed, in order to make it easy to remove the work from the machine without necessitating thought and effort on the part of the operator. This may also involve turning off the fluid which is pumped to the grinding zone to cool the work as it is ground.

*Automatic control of feed wheel*

The wheel feed may be stopped automatically by means of a manually controllable power driven mechanism. The form illustrated is one which insures stopping the cam 40 when the cam roller 43 is resting on the highest portion of the cam, thereby preventing the weight from turning the cross feed screw when the wheel is farthest removed from the work. The mechanism for driving the cam 40 and for automatically stopping the same, as illustrated in Figs. 2 to 5 inclusive, may comprise a power driven pulley 60 on the shaft 61 which is connected through a clutch and a reduction train of gears with the shaft 41. This gearing comprises the sprocket 63 on the shaft 41 driven by a chain 64 from a sprocket 65 on the shaft 66 which is likewise driven by the gears 67 and 68, the worm gear 69 and the worm 70. The worm 70 is mounted on a further shaft 71 which is rotated by the gear 72 thereon and the gear 73 loosely mounted on the shaft 61.

A clutch to control this mechanism comprises, as illustrated, a toothed hub or sleeve 74 integral with gear 73 and a slidable sleeve 75 keyed to the shaft 61 and having clutch teeth adapted to engage a similar set of teeth 76 on the member 74. The clutch may be suitably operated by a control mechanism which comprises a yoked arm 78 riding within the groove 79 formed in the slidable clutch sleeve 75. The yoke 78 is pivoted on the stud 80 suitably fastened to the machine base, and this yoke is adapted to be swung laterally by means of a bell crank lever fixed thereto. The bell crank has arms 82 and 83, the latter of which is connected by the pull and push rod 84 with the control lever 85 pivotally mounted on the machine base and connected through a rock shaft 87 with a short arm 86 arranged to move the rod 84 up and down and thereby throw the clutch. In order to hold the clutch in operative or inoperative position, we provide in the present instance a load and fire toggle mechanism which comprises a rod 88 pivotally mounted on the end of the lever 82 and slidable through a hole in the angle iron 89 pivoted on the frame work on the machine. A spring 90, which is maintained under compression, tends to hold the lever 82 at one side or the other of a center line between the pivot 80 and the point of support of the member 89. Hence, it will be seen that when the rod 84 is pulled up the clutch will be disconnected and held out of contact until the rod is pushed downwardly to throw the clutch teeth into engagement, and they will be there held in engagement by the spring 90.

In order to disconnect the clutch automatically, we provide a knock-out device which may be operated from the cam shaft 41 which carries the wheel feed operating cam. To this end, a lever 92 is pivoted at an intermediate portion on the pin 93, and one end of the lever is pivotally connected to the pull rod 84, which is made in two parts linked together by the pin 94 mounted on the lever 92. The other end of the lever 92 carries a roller 96 which is adapted to be struck by a cam or striking member mounted on the shaft 41 so as to turn the lever and thereby cause the rod 84 to be raised and the clutch to be disconnected.

Figure 6:
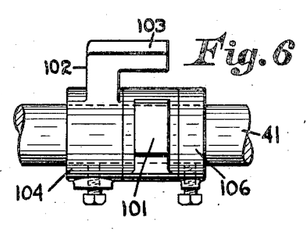
Figs. 6 and 7 are side and end elevations respectively, partly broken away, of the clutch throwing mechanism.
Figure 7:
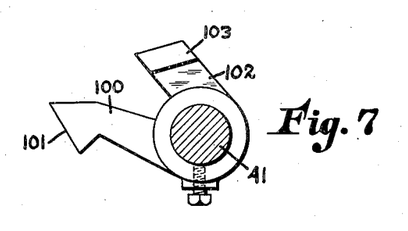

The cam member which strikes the roller 96 and swings the lever 92, as shown particularly in Figs. 6 and 7, comprises an arm 100 having a bevelled face 101 arranged to contact with the roller 96 as the arm 100 revolves about the shaft 41 on which it is loosely mounted. In order to drive this arm 100, we provide a driving arm 102 having a projecting lug 103 which follows along in the rear of the arm 100 and strikes the rear face thereof and forces it to move forward. The arm 100 is mounted on a collar 104 which is fastened by a set screw to the shaft 41. A collar 106 likewise fixed to the shaft prevents lateral movement of the arm 100 and maintains it in proper position.

It will therefore be seen that as the cam 40 makes a complete cycle, the driving arm 102 likewise describes a complete revolution forcing the cam member 100 ahead of it until the latter comes to the top of the circle where it falls forward lightly against the roller 96 and rests there. When the driver 102 overtakes the arm 100 it forces the roller to ride up the cam face 101 and so rock lever 92 and raise the arm 84 and disconnect the clutch. The clutch stays disconnected and the wheel feed remains stationary until the hand lever 85 is swung in the opposite direction to push down on the rod 84 and connect the clutch again and cause the driving operation of the wheel feed cam. The cams are so arranged that when the striker cam moves the roller 96 and throws the clutch, the cam roller 43 is on the high point of cam 40 and the grinding wheel is accordingly removed from the work as far as possible, whereby the work may be easily taken from the machine and replaced by an unground piece.

*Automatic control of work rotation*

The work rotation, in accordance with our invention, may be stopped in timed relation with the wheel feed. This involves stopping the rotation of the headstock spindle when the grinding wheel has reached its rearward position and thereby permitting one to replace the work easily and quickly. While we may provide various types of control mechanisms for this purpose, within the scope of our invention, we preferably provide a pneumatically operated device which is so constructed and controlled from the cam shaft 41 that when the machine is stopped with the wheel in the rearward position a clutch on the headstock will be held disengagement, and when the machine is again started the pneumatic device will automatically cause the clutch to be connected and the headstock spindle to start in rotating. A suitable pneumatic device comprises an air controlled piston connected with a clutch on the headstock spindle and spring pressed in such a manner that the pressure of the spring tends to keep the clutch connected but when air is introduced into the piston, the clutch will be held disconnected until the air pressure is released.

Figure 8:
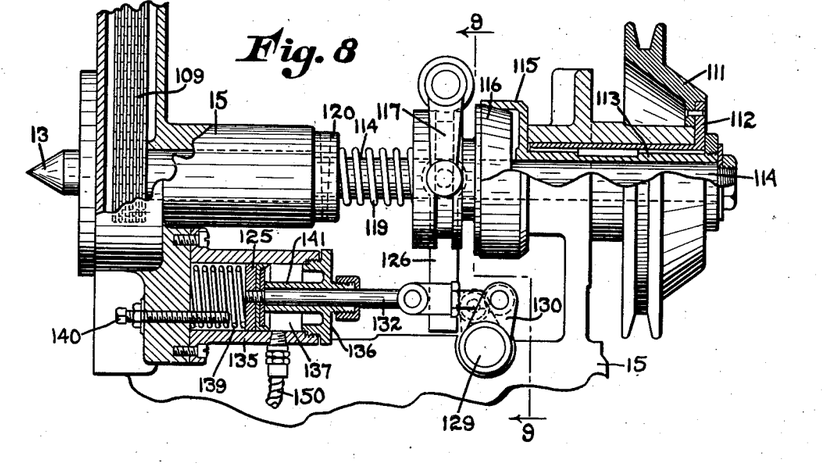
Fig. 8 is a fragmentary rear view (partly in section) of the headstock spindle driving and control mechanism.
Figure 9:
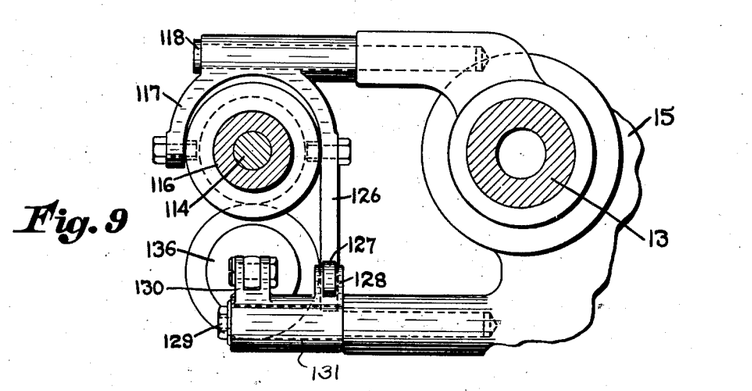
Fig. 9 is a fragmentary sectional view taken on the line 9—9 of Fig. 8.

As shown particularly in Figs. 1, 2, 8 and 9, the headstock spindle 13 is suitably mounted in the casing 15 and is driven by belt or chain 109 from spindle 114 which is in turn driven by an electric motor 110 or other suitable power mechanism through an intermediate reduction gearing including the pulley 111. This pulley is fixed to a sleeve 112 which is rotatably mounted in the headstock casing and is in turn keyed to a further sleeve 113 which is rotatable on the spindle 114 suitably mounted in the headstock casing. The sleeve 113 terminates in one member 115 of a friction cone clutch which is adapted to be engaged by the slidable clutch member 116. The clutch member 116 is provided with a groove engaged by rollers on the arms of a yoke 117 which is pivotally mounted on a stud 118 suitably supported on the frame. A spring 119 which is held under compression between the clutch member 116 and a collar 120 pinned to the spindle 114, as shown in Fig. 8, serves to hold the clutch members in engagement except when they are held out by force.

In order to operate this clutch by a pneumatic device, we connect the yoke 117 with the plunger 132 of a fluid pressure motor piston 125. To this end the extension 126 of one of the yoke arms is projected downwardly to a point where it may be engaged by a roller 127 mounted on an arm 128 which is pivotally mounted on the stud 129 fastened to the headstock casing. A second arm 130 on a sleeve 131 which carries the arm 128, is connected by a link to the end of the plunger rod 132 connected with the piston 125.

The piston 125 is mounted within a cylindrical casing 135 which is suitably supported on the headstock. The end of the casing 135 is closed by a head 136 which is provided with the usual packing and bland to form an air-tight chamber 137 between this head and the piston. In the rear of the piston and between it and the casing wall 15 which supports the cylinder, is a spring 139 maintained under compression. This spring tends to move the piston rod outwardly and force the yoke arm in such a direction as to keep the clutch parts connected. An adjustable screw 140 on one side and the inwardly projecting boss 141 of the head 136 limit the stroke of the piston 125, which may be adjusted by turning the screw 140.

In order to admit air to the casing 135 in timed relation with the operation of other parts of the machine, we provide a main air valve 145 (Fig. 2) which is suitably located and arranged to control the admission and exhaust of air from the inlet pipe 146 and to the outlet pipe 147 respectively. The inlet pipe 146 is connected to a suitable source of compressed air, as is usually provided in the modern manufacturing plant where this machine would be used. As illustrated, this valve may comprise a casing having a cylindrical bore in which a plunger 148 is slidably mounted. The plunger has a reduced portion 149 forming an annular passage therearound which communicates with one or the other of the ports connected to the inlet 146 and the exhaust pipe 147. A pipe 150 connects the piston chamber 137 with the annular space around the reduced portion 149 in the valve casing, and these parts are so arranged that the valve rod 148 may connect the port to pipe 150 with either the exhaust pipe 147 or the inlet pipe 146.

Figure 1:
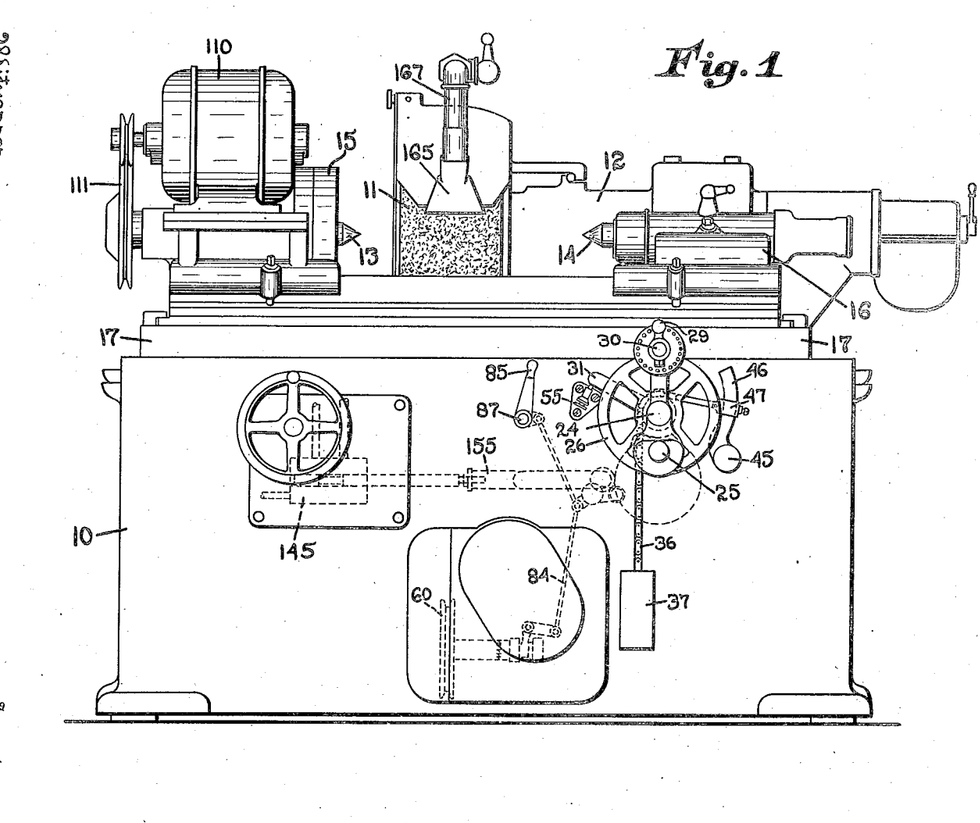
Figure 1 is a front elevation of the machine, with parts removed and others shown in dotted outline.
Figure 2:
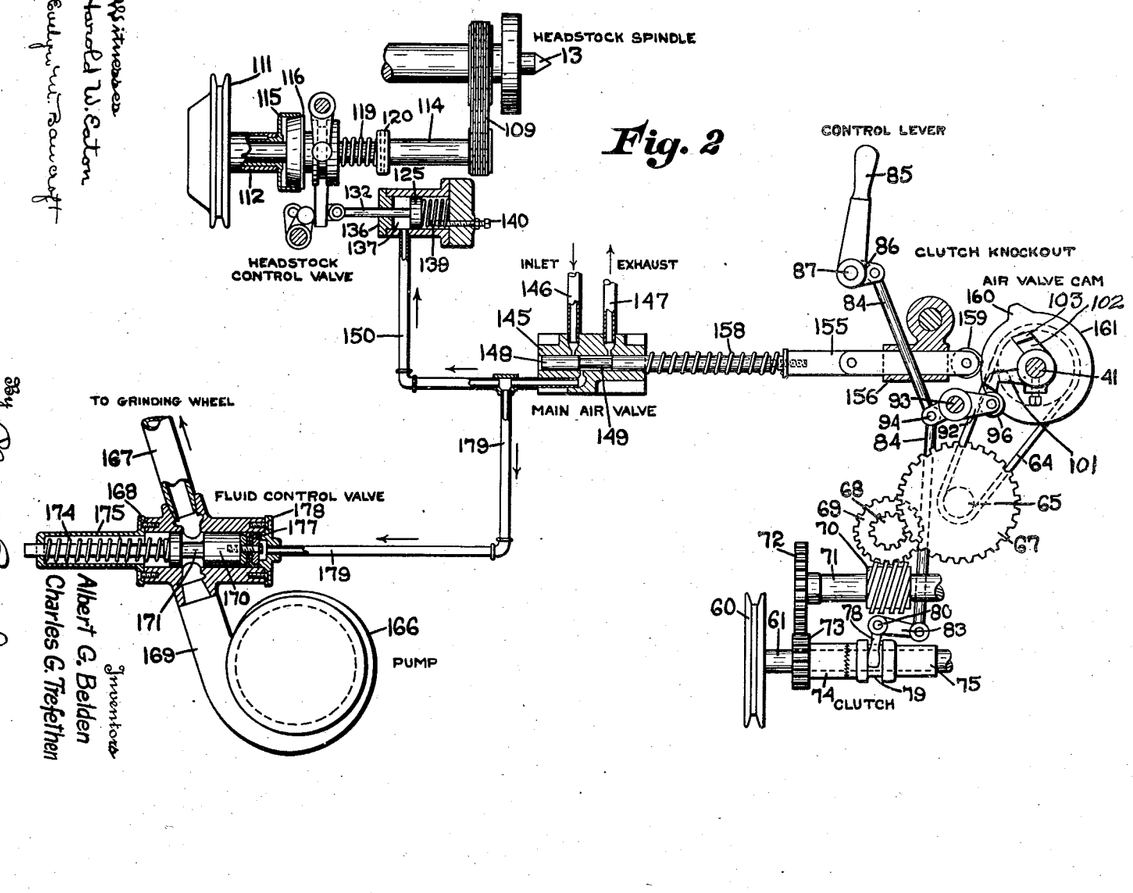
Fig. 2 is a somewhat diagrammatic view of the cam controlled pneumatically operated parts of the mechanism combined in a single machine.

The valve rod is operated, as shown particularly in Figs. 2 and 10, by means of a slide 155 suitably supported in a bracket 156 on the casing. This slide is connected to the valve rod 148 and the valve rod is held in an outward position, which connects the pipe 150 with exhaust pipe 147, by means of a spring 158 between a shoulder on the slide 155 and the end of the valve casing 145. On the other end of the slide 155 a roller 159 is mounted, and this roller is adapted to be engaged by the projection 160 on a cam 161 mounted on the shaft 41.

This cam 161 is fixed to the shaft 41 so as to rotate therewith and its contour is circular except for the raised portion 160 which may be shaped substantially as illustrated in Figs. 2 and 10. As shown in Fig. 10, this cam is so located that when the cam roller 43 is on the upper portion of the cam 40 and the knock-out arm 110 engages the roller on the clutch operating arm 92, the roller 159 rests on the high spot 160 of the cam 161. At this time when the wheel feed is stopped the sliding valve rod 148 will have been pushed to the left, as shown in Fig. 2, to such an extent as to connect the pipe 150 with the inlet pipe 146 and thereby permit air to enter the valve space 137 and move the clutch member 115 in such a direction as to disconnect the clutch parts. This clutch will remain disconnected and accordingly the work will not be rotated during such time as the cams remain in this position. Then when the control lever 85 is thrown to start the machine, the air control cam 161 again starts rotating and the spring 158 causes the valve rod 148 to move to the right and so connect the pipe 150 with the exhaust port. This permits air to escape from the space 137 in the cylinder and the spring 119 immediately serves to connect the clutch parts 115 and 116 and so start rotation of the work.

*Automatic control of the water flow*

A further feature of our invention, which may be employed wth the other parts of the mechanism above described, comprises an automatically controlled arrangement for stopping and starting the flow of water or grinding compound to the grinding zone at the point of contact between the wheel and the work. This flow of liquid should be turned off in order to make it easy for the operator to remove the old piece of work and replace it by a new one. To this end, we may utilize a valve to connect and disconnect the fluid nozzle 165, shown in Fig. 1, with the pump 166, diagrammatically shown in Fig. 2, which derives its source of liquid supply from a storage tank, as is customary. For this purpose, the pipe 167 which is connected with the nozzle 165 opens into a hollow valve casing 168 and the pump 166 is similarly connected by a pipe 169 with the interior of such casing. A slidable plunger 170 mounted within this casing has a reduced portion 171 forming an annular passage arranged to connect the ports opening to the pipes 167 and 169 respectively. The right hand portion of the valve rod 170, as shown in Fig. 2, has a cylindrical surface of considerable extent snugly fitting the valve casing. This arrangement is such that if the plunger rod is moved to the left, it will serve to close the ports to the pipes 167 and 169 and so cut off the flow of liquid to the grinding wheel. This valve rod 170 is normally held in a position to connect the ports by means of a spring 174 located within an extension of the valve casing 175 and surrounding the reduced end of the slide 170. This spring is held under compression, thereby tending to move the rod always towards the right. In order to move the valve to the left and shut off the flow of grinding compound, we provide the rod 170 with a suitable position head packing 177 and place a head 178 on the open end of the casing to form a piston chamber within which air may be admitted under pressure. For this purpose the pipe 179 opening into the piston chamber is connected with the pipe 150 so as to receive a supply of air from the inlet pipe 146.

It will therefore be seen that when the slide rod 155 and valve stem 148 are moved to the left by the cam projection 160, the air will be maintained under pressure in the chamber 137 to keep the clutch disconnected and the valve 170 will be held in position to prevent the flow of water to the work, due to connecting the inlet port 146 with the two casings. When the cam roller 159 is on the cylindrical surface 161 of its controlling cam, the valve rod 148 will be held in its right hand position, thereby connecting the pipes 179 and 150 with the exhaust port 147 and permitting the escape of air from the two valve casings 125 and 168 thereby causing water to flow to the grinding wheel and the work to be rotated.

Figure 3:
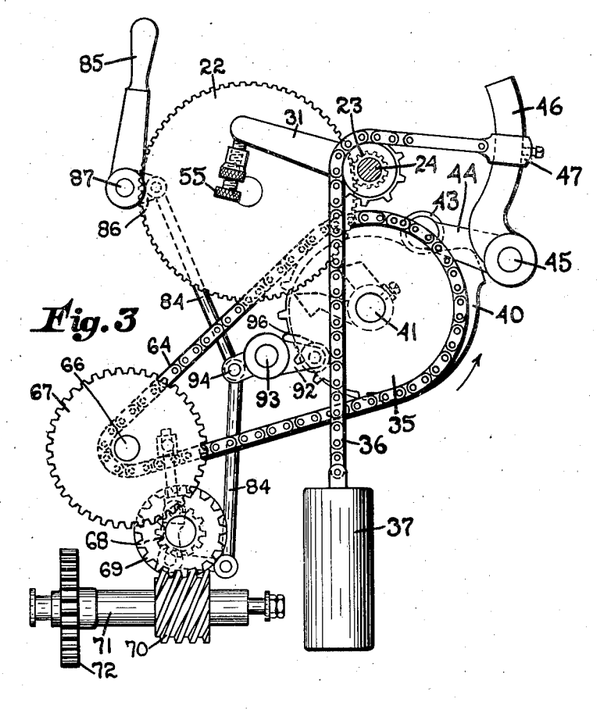
Fig. 3 is a front elevation of the wheel feed mechanisms with the supporting parts and the micrometer feed wheel removed.

The operation of this machine will be apparent from the above disclosure. As shown in Figs. 2 and 3 the cam shaft 41 is positively driven through the clutch mechanisms 74 and 75 from any suitable source of power. The grinding wheel is fed towards and from the work by means of the automatically and positively actuated screw feed mechanism. The infeed of the wheel toward the work is caused by a weight 37 and the feeding movement is controlled by the positively rotated cam 40 which engages the roller 43 on one arm 44 of a lever, the other arm of which is the involute shaped arm 46 connected by the slidable link 47 with the end of the chain 36. As the cam 40 rotates, the roller 43 travels from the high spot on the cam down the inclined plane of the cam until it reaches the portion 52 (Fig. 10) where the grinding of the work has been completed. Thereafter the cam roller 43 goes up the ascending portion 53 of the cam and withdraws the wheel positively from the work. When the cam roller 43 reaches the top portion of this cam 40, a knock-out arm 100 which is carried on the shaft 41 is forced into engagement with the roller on the end of the rock lever 92 in such a manner as to raise the clutch control rod 84 and throw the clutch to the right and thereby disconnect the power drive from the cam control shaft 41. This causes the grinding wheel to be held in its rearward position and the wheel cannot be fed forward until the control lever 85 is manually moved in such a way as to connect the clutch parts 74 and 75. At approximately the time when the grinding wheel reaches its rearward position, the cam 161 is also rotated by the shaft 41 and moves the slide valve 148 of the pneumatic control device in such a manner as to connect the inlet pipe 146 with the pipes 150 and 179 and so stop the rotation of the work and the flow of fluid to the grinding wheel. When the main clutch is again thrown to start the machine, the cams begin to revolve and the rod 148 is moved to the right, Fig. 2, thereby connecting pipes 150 and 179 with the exhaust pipe 147 and releasing the air pressure in the headstock control valve and the fluid control valve. This causes the spring 119 on the headstock to connect the clutch parts to start the work rotating and the spring 174 in the fluid control valve connects the pump with the grinding zone.

Having thus described our invention, what we claim as new and desire to secure by Letters Patent is:

1. A cylindrical grinding machine comprising a base, a rotatable grinding wheel and a work support which are movable relatively toward and from each other, a cross feed screw and nut connected to cause such movement, a power actuated mechanism including a cam and a follower operatively connected to rotate the feed screw in both directions through a predetermined angular distance and at a varying rate and means operated in timed relation with said power actuated mechanism to stop the same after the grinding wheel has finished its cutting operation.

2. A cylindrical grinding machine comprising a base, a rotatable grinding wheel and a work support which are movable relatively toward and from each other, a cross feed screw and nut connected to cause such movement, a power actuated mechanism including a cam and a follower operatively connected to rotate the feed screw in both directions through a predetermined but adjustable angular distance and at a varying rate and means operated in timed relation with said power actuated mechanism to stop the same after the grinding wheel has finished its cutting operation.

3. A cylindrical grinding machine comprising a base, a rotatable grinding wheel and a work support thereon which are movable relatively toward and from each other, a cross feed screw and nut connected to cause such movement, a power actuated mechanism including a clutch, a rotatable cam and a follower operatively connected to rotate the feed screw through a predetermined angular distance in one direction to feed the wheel into the work and then to rotate the screw in the reverse direction to remove the wheel from the work, and mechanism operating in timed relation with said cam movement to disengage the clutch and stop further movement of the wheel when the wheel has been removed from the work.

4. A cylindrical grinding machine comprising a base, a work support thereon, a rotatable grinding wheel, a wheel slide carrying the same which is movable toward and from the work, a cross feed screw and nut connected to move said slide, a power actuated mechanism including a cam and a follower operatively connected to rotate the feed screw through a predetermined angular distance and in both directions to feed the grinding wheel into the work and thereafter remove the wheel from the work, a clutch controlling the operation of the cross feed screw, means operating in timed relation with the rotation of the cam to disconnect the clutch when the cam has moved through a given cycle of operations and a control lever for manually throwing the clutch.

5. A grinding machine comprising a base, means for rotatably supporting work thereon, a rotatable grinding wheel mounted for movement toward and from the work, a cross feed screw operatively connected to move the grinding wheel, a positively rotated cam, power mechanism controlled by and associated with the cam to turn the cross feed screw in opposite directions and thereby move the grinding wheel toward and from the work cyclically through a predetermined motion of variable extent, power driving mechanism including a clutch to rotate said cam and means operated in timed relation with said cam to throw the clutch and stop the movement of the wheel when it has reached a predetermined point.

6. A cylindrical grinding mechine comprising a rotatable support for cylindrical work, means including a clutch to rotate the same, a grinding wheel opposed thereto, a slide for the wheel movable towards and from the work, a cross feed screw and nut connected to move the slide, cam mechanism to turn the screw continuously through a predetermined angular distance in both directions to feed the wheel into the work and then withdraw it, and means operating in timed relation with said mechanism to disconnect said clutch after the wheel has been removed from the work.

7. A cylindrical grinding machine comprising a rotatable support for cylindrical work, means including a clutch to rotate the same, a grinding wheel opposed thereto, a slide for the wheel movable towards and from the work, a cross feed screw and nut to move the slide, a power driven mechanism including a cam shaft and cam connected to rotate the screw in opposite directions to move the wheel towards and from the work to grind the work to a predetermined size, and a power connection between the cam shaft and said clutch to disconnect the latter when the shaft has made a single revolution.

8. A cylindrical grinding machine comprising a rotatable support for cylindrical work, power driven mechanism including a clutch to rotate the work continuously, a grinding wheel opposed thereto, a slide for the wheel movable towards and from the work, power operated feeding mechanism for moving the wheel slide in both directions through a predetermined cycle to grind the work to a given size, a clutch to control the feeding mechanism and means operating in timed relation with the feeding mechanism to disconnect both of the clutches when the wheel has moved through a single cycle towards and from the work.

9. A grinding machine comprising a base, a rotatable grinding wheel thereon, a spindle to rotate and support a piece of work in operative relation to the wheel, power mechanism to rotate the spindle, a nut and screw mechanism to feed the wheel into the work, a fluid pressure device including a valve arranged to control said power mechanism, a cam mechanism to rotate said screw to feed the grinding wheel towards the work, and means operating in timed relation with said cam mechanism to actuate said valve and thereby admit fluid under pressure to said device and stop the work rotation when the wheel has reached a given position.

10. A grinding machine comprising base, a rotatable grinding wheel thereon, means to support a piece of work rotatively in contact with the wheel, means including a pump and a valved pipe to supply liquid to the wheel and work, a fluid pressure operated valve to control the flow of liquid through said pipe, power mechanism including a clutch to rotate the work, a fluid pressure device to operate the clutch, a main control valve arranged to control the fluid pressure to actuate said valve and fluid pressure device, and means including a cam controlling mechanism to move the main control valve and thereby operate the clutch and control the fluid flow in timed relation.

11. A cylindrical grinding machine comprising a support for cylindrical work, a grinding wheel opposed thereto, mechanism to feed the grinding wheel toward and away from the work, a pump and a valved pipe arranged to supply fluid to the grinding wheel and work, a cam mechanism connected to actuate said wheel feed mechanism, and means acting in timed relation with said cam mechanism to actuate said valve and control the fluid flow in timed relation with the wheel movement.

Signed at Worcester, Massachusetts, this 17th day of Feb. 1926.

ALBERT G. BELDEN.
CHARLES G. TREFETHEN.